United States Patent Office 3,327,195
Patented June 20, 1967

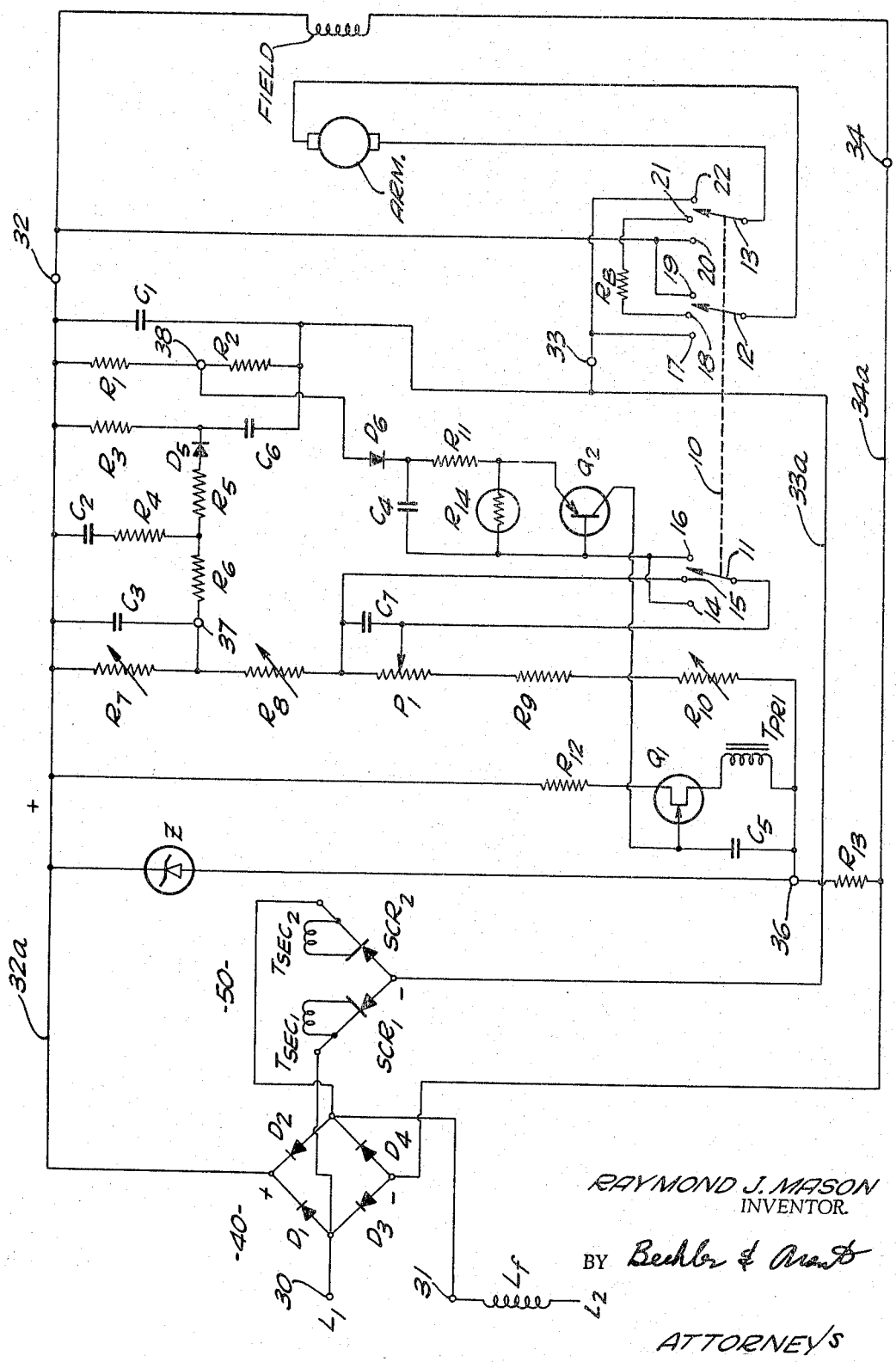

3,327,195
REGULATED POWER SUPPLY CIRCUIT UTILIZ-ING CONTROLLED RECTIFIER
Raymond J. Mason, Lynwood, Calif., assignor to Minarik Electric Company, Los Angeles, Calif., a corporation of California
Filed Aug. 24, 1964, Ser. No. 391,627
15 Claims. (Cl. 318—331)

ABSTRACT OF THE DISCLOSURE

A combined power supply, speed selection, and speed control circuit for a direct current motor having a shunt field; the power supply circuit including a semiconductor diode bridge rectifier for energizing the field, and a separate bridge rectifier including a pair of silicon-controlled rectifiers for energizing the motor armature; a control circuit for initiating conduction of the silicon-controlled rectifiers; the speed selection circuit including a potentiometer having a movable tap so as to establish a selected motor speed; a large capacitor connected in parallel with the motor armature for stabilizing the armature voltage during the portions of each cycle when neither silicon-controlled rectifier is conducting; a first feedback circuit for developing a D.C. control voltage whose amplitude is proportional to the ripple voltage across the large capacitor; a second feedback circuit developing a voltage which is proportional to the average voltage across the armature; and circuit means for applying both feedback voltages to the control transistor so as to add to or subtract from the effect of the potentiometer.

---

The present invention relates to a regulated power supply circuit utilizing at least one controlled rectifier, and more particularly, to such a power supply circuit having a storage capacitor shunted across the output terminals thereof.

Power supply circuits utilizing one or more controlled rectifiers are generally characterized by intermittent current flow, as distinguished from the pulsating type of direct current which results from full wave rectification. A very high degree of power efficiency is obtained utilizing controlled rectifiers in this manner, but the resulting intermittent current flow is not necessarily adapted to the requirements of the particular load which is being served. One method of preserving the high power efficiency of the circuit while at the same time providing a substantially uniform current flow to the load is to utilize a storage capacitor connected in shunt across the output terminals of the power supply circuit. The storage capacitor then receives a series of discrete current pulses through the controlled rectifier or rectifiers of the circuit, and intermediate to the receipt of such pulses of charging current it reverses its current flow and discharges current into the load with which it is connected in a series loop circuit. It is this type of power supply circuit with which the present invention is concerned.

The primary object of the present invention is to provide a regulated power supply circuit of the foregoing type, and which includes a novel feedback circuit for controlling the conduction of the controlled rectifier.

A further object of the invention is to provide a circuit of the foregoing type which includes provision for adjusting the voltage to a selected value.

Another object of the invention is to provide a circuit of the type described, having means to compensate both for load changes and for changes in the supply line voltage.

Yet another object of the invention is to provide a circuit of the type described, which is specifically adapted to be used as a motor control circuit, and which includes means for over compensating the output voltage as a function of load changes.

Yet a further object of the invention is to provide a motor control circuit of the foregoing type which is adapted to avoid the rapid inrush of current which is generally associated with the starting of an electric motor.

The objects and advantages of the invention will be more fully understood from the following description considered in conjunction with the accompanying drawing, wherein the sole figure is a schematic diagram of one of the present preferred embodiments of the invention.

Referring now to the drawing, terminals 30 and 31 represent the input terminals of the power supply circuit, which are adapted for connection thereto of lines L1 and L2 of an alternating current supply circuit. A bridge rectifier 40 includes diodes D1 and D2 whose anodes are connected to respective ones of the terminals 30 and 31, and whose cathodes are connected together at a terminal 32; and diodes D3 and D4 whose cathodes are connected to respective ones of the terminals 30 and 31 and whose anodes are connected together at a terminal 34. Terminals 32 and 34 represent output terminals of the power supply circuit, with terminal 32 being the positive output terminal and terminal 34 being an auxiliary negative output terminal. The main negative output terminal is identified as 33.

A second bridge rectifier circuit 50 includes the diodes D1 and D2, and also a pair of controlled rectifiers SCR1 and SCR2. Controlled rectifier SCR1 has its cathode terminal connected to the input terminal 30 and its anode connected to the output terminal 33, while controlled rectifier SCR2 has its cathode connected to terminal 31 and its anode connected to terminal 33. The gate terminals of the rectifiers SCR1 and SCR2 are controlled by respective secondary windings TSEC1 and TSEC2 of a pulse transformer, in conventional fashion.

It will thus be seen that the main or primary power supply circuit provides intermittently flowing current to the output terminals 32 and 33, with the length of the current pulses being controlled by the controlled rectifiers; and the auxiliary power supply circuit provides full-wave rectified current, or pulsating direct current, at the output terminals 32 and 34. The present invention is mainly concerned wtih the regulation of current and voltage at the output terminals 32 and 33 of the regulated power supply circuit.

A storage capacitor C1 having a large capacitance value is connected between the output terminals 32 and 33. The power supply circuit is also adapted for connection of the load between the output terminals 32 and 33. The type of load illustrated in the present drawing is the armature of a direct current motor of the shunt type, but in general any other type of load may also be served by the power supply circuit of the present invention. For example, the load connected between the output terminals 32 and 33 may be series combination of field and armature windings of a series motor, or may be any type of non-rotating load.

Under some circuit conditions the time period during which each of the controlled rectifiers conducts current after it is turned on corresponds to less than 90° of the alternating cycle of the supply line voltage. In that event each current pulse received by the storage capacitor C1 has a time duration less than half a half cycle of the supply line voltage, but the current pulse which the capacitor C1 supplies to the load device is of a time duration more than half a half cycle of the supply line voltage. Under some conditions the time period between current pulses through the controlled rectifiers may be about twice as long as the duration of each such current pulse. Therefore, the storage capacitor C1 performs a very significant function in accepting charging current from the controlled rectifiers, and then after each such charging pulse, discharging a portion of its accumulated charge into the load device so as to maintain a substantially uniform current flowing to the load. In order to perform its function efficiently and at the same time avoid objectionable overheating, it is necessary that the value of capacitor C1 be rather large, with the precise value being determined by the circuit voltage, load current requirements, and other design parameters of the circuit.

When the current drawn by the load increases, the periodic charging and discharging of capacitor C1 also increases. The voltage across capacitor C1 also has an average or D.C. value which may change with changes in the load current. Furthermore, changes in the line voltage may occur either slowly or rapidly, which may change either the average or alternating components of voltage appearing across capacitor C1.

According to the present invention two different feedback signals are derived from the capacitor C1, and are utilized in a cooperative fashion to control the turning on of the controlled rectifiers. Accordingly, two separate feedback circuits are utilized, each of which detects and transmits to the control circuitry a different characteristic of the voltage appearing across capacitor C1.

A first feedback circuit includes capacitor C6, resistor R3, diode D5, resistor R5, resistor R4, capacitor C2, resistor R6, and capacitor C3. Capacitor C6 is connected to output terminal 33, and resistor R3 is connected between output terminal 32 and the other side of capacitor C6. Diode D5 has its cathode connected to the juncture of capacitor C6 and resistor R3, while its anode is connected to resistor R5 whose other end is connected through resistor R4 and capacitor C2 to the output terminal 32. Resistor R6 is connected to the juncture between R4 and R5, with the other terminal of R6 being connected through capacitor C3 to terminal 32. The juncture of R6 and C3 represents the output terminal of the first feedback circuit.

In the first feedback circuit the function of capacitor C6 is to block the average or D.C. voltage appearing across capacitor C1, and at the same time to effectively pass the ripple voltage which exists across capacitor C1 at the frequency of the current pulses received from the controlled rectifiers. As previously mentioned this ripple voltage varies with variations in the load current supplied by the power supply circuit, with its amplitude being substantially proportional to the amplitude of the load current. Capacitor C6 causes the ripple voltage to appear across resistor R3, and it is then rectified by the diode D5. The remaining circuit elements R5, R4, C2, R6, and C3 of the feedback circuit act as a smoothing filter to smooth the rectified voltage, which then appears at the output terminal 37, representing the output signal developed by the first feedback circuit. It will thus be seen that the first feedback circuit develops between the terminals 37 and 32 a direct control voltage whose amplitude is substantially proportional to the amplitude of the ripple voltage occurring across storage capacitor C1 at the frequency of the pulses received from the controlled rectifiers.

The second feedback circuit includes a resistor R1 connected to output terminal 32, and a resistor R2 connected between the other end of R1 and the output terminal 33. The juncture of R1 and R2 is designated as terminal 38. R2 has a value much greater than that of R1, hence the voltage between terminals 32 and 38, which is the signal selected by the second feedback circuit, represents a small proportion of the total voltage appearing across capacitor C1. The voltage appearing between the terminals 32 and 38 includes both the direct current and alternating current components of the voltage across capacitor C1, but as will subsequently be explained, it is the direct component of voltage which is of the greatest importance.

A Zener diode Z has its cathode terminal connected to the positive supply line 32a associated with output terminal 32, while its anode is connected to the resistor R13 whose other end is connected to the negative supply line 34a associated with output terminal 34. The juncture between resistor R13 and Zener diode Z is designated as terminal 36; and the voltage between line 32a and terminal 36 represents a regulated voltage (established by the Zener) which is used to supply the control circuitry of the present invention. The primary winding of pulse transformer T has one end connected to terminal 36 while its other end is connected to base II of a unijunction transistor Q1. A resistor R12 is connected between line 32a and base I of the unijunction transistor. A capacitor C5 is connected between terminal 36 and the emitter of the unijunction transistor. The Zener diode provides a fixed voltage for biasing the base circuit of the unijunction transistor; current supplied to the emitter builds up a charge on capacitor C5; and when the voltage across C5 brings the emitter to its firing voltage a pulse of current flows through the base circuit of the unijunction transistor thus pulsing both secondary windings of the pulse transformer. One or the other of the controlled rectifiers will be triggered into conductivity, depending upon the polarity of the supply line voltage at the time of the trigger pulse. It will be recognized that this circuitry for triggering the controlled rectifiers is entirely conventional at the present time. The emitter of the unijunction transistor is controlled by a transistor Q2, which is in turn controlled by the two feedback circuits that have previously been described.

A voltage divider includes a variable resistor R7 connected to the line 32a, a variable R8 connected to the other end of R7, a potentiometer P1 having one of its ends connected to the other end of R8, a fixed resistor R9 connected to the other end of P1, and a variable resistor R10 connected between the other end of R9 and terminal 36. Output terminal 37 of the first feedback circuit is connected to the juncture of R7 and R8. The variable nature of R7 permits adjusting the degree of compensation which is achieved by the control circuit; that is, when R7 is set for a low or nearly zero value the compensation of the output voltage in response to changes occurring in the load current is at a minimum, but when R7 is set at its maximum value the compensation of the output voltage in response to load current changes is at a maximum. The movable tap of potentiometer P1 feeds the base of transistor Q2, and provides a means of selecting the desired value of output voltage for the power supply circuit, to appear across the output terminals 32 and 33. When the power supply circuit is used to control an electric motor, as presently illustrated, the potentiometer P1 provides the means for selecting the normal speed at which the motor is to operate. Resistor R8 may be varied for establishing the upper limit of the range of potentiometer P1, and resistor R10 may be varied for establishing the limit of the lower range of potentiometer P1.

The emitter of transistor Q2 is energized by the signal fed back from terminal 38 of the second feedback circuit, previously described; the base of Q2 is normally connected to the movable tap of potentiometer P1; and the collector of Q2 is connected to the emitter of the unijunction transistor Q1 for controlling the firing thereof. In the emitter lead of Q2 there is connected a resistor R11, as well as a diode D6 whose cathode is connected to the other end of R11 while its anode is connected to terminal 38. The capacitor C4 is connected between the cathode of D6 and the base of Q2. Diode D6 protects transistor Q2 from being ruptured under certain operating conditions. Diode D6 is preferably a germanium diode and provides temperature compensation for the transistor Q2.

In the particular motor control circuit illustrated in the drawing, a three-pole three-position switch 10 is utilized for reversing the dynamic braking of the motor armature. Switch 10 includes three ganged switch blades 11, 12 and 13. The fixed end of switch blade 11 is connected to the movable tap of potentiometer P1, while its movable end selectively engages contacts 14, 15 or 16. Contacts 14 and 16 are connected to the base of Q2, while contact 15 is connected to the juncture of P1 and R8. The fixed ends of switch blades 12 and 13 are connected to respective ends of the motor armature, and their movable ends selectively engage contacts 17, 18 19 (blade 12), and contacts 20, 21 and 22 (blade 13). Contacts 19 and 20 are connected to output terminal 32, while contacts 17 and 22 are connected to output terminal 33. A braking resistor Rb is connected between the terminals 18 and 21. The motor field is connected between terminals 32 and 34.

The central position of the switch 10 is the dynamic braking position, and in that position the armature is not supplied with current from the power supply, but instead generates a voltage which is dissipated in the braking resistor Rb. In the two extreme positions of the switch the armature is energized by the power supply, but in opposing directions, so that one of those positions represents forward rotation of the motor while the other position represents reverse rotation.

An acceleration capacitor C7 has one end connected between the juncture of R8 and P1 while its other end is connected to the movable tap of P1. The sole purpose of capacitor C7 is to permit the motor, when the control circuit is first energized, to accelerate slowly, thus avoiding the usual high surge of starting current. When the control circuit is turned off the capacitor C7 discharges through potentiometer P1. In the case where the three-position switch 10 is used to reverse the direction of motor rotation, it is desirable to utilize capacitor C7 to provide slow initial acceleration of the motor in its reverse direction. Therefore, as switch 10 passes through its intermediate position, blade 11 engages contact 15 to which the upper terminal of capacitor C7 is connected, and the capacitor is immediately discharged. When switch 10 is moved on to its reversed position the capacitor C7 is in an uncharged condition, the same as when the circuit is initially turned on.

When the movable tap of potentiometer P1 is at its upper extreme the output voltage of the power supply circuit (operating speed of the motor) is at its minimum value. When the circuit is first turned on, and the switch 10 set for one of the running positions (blade 11 contacting either contact 14 or contact 16), then the potential of the base of Q2 is initially that potential provided by the upper end of potentiometer P1. As capacitor C7 charges the potential of the transistor base reaches that provided for it by the movable tap setting of P1. Thus when the circuit is first turned on there may be insufficient current flow through transistor Q2 to pulse the junction transistor Q1 at all; and consequently, the controlled rectifiers may remain nonconductive for a number of cycles of the applied voltage. But despite the fact that the controlled rectifiers may supply no current to capacitor C1 (resulting in no output voltage between terminals 32 and 33), the output voltage across terminals 32 and 36 is immediately established, and the charging of capacitor C7 immediately commences. When capacitor C7 is partially charged the controlled rectifiers are triggered on, and the normal operation is then initiated.

It is not essential that the two feedback circuits provided by the present invention be used in cooperation with each other. Either feedback circuit may be used alone. The first feedback circuit including the blocking capacitor C6 and the "notch filter" provides adequate compensation for load changes, but does not compensate for changes in the line voltage. The second feedback circuit including resistor R1 and the diode D6 provides a limited amount of compensation for load changes but mainly acts to compensate for line voltage changes. The degree of compensation provided by each of these feedback circuits may be adjusted by varying the constants of the particular circuit.

Where the regulated power supply circuit is used for controlling the speed of a direct current motor, as presently illustrated, a different requirement exists than in the case of most other types of loads. This requirement is that the output voltage of the power supply circuit must not merely be maintained as load current increases, but in fact must be increased in order to hold the motor speed constant. A control circuitry therefore necessarily involves a positive feedback as with its attendant problem of oscillation, as described for example in U.S. Patent No. 3,134,065 issued May 19, 1964, to William J. Minarik.

In accordance with the present invention the oscillation or hunting problem is avoided in the following manner. The feedback circuit including resistor R1 and diode D6 does not provide sufficient compensation to be capable of producing oscillation. Furthermore, in any event, it transmits a signal which is mainly a direct voltage with only a small alternating component. But the capacitor C6 passes to its associated notch filter only an alternating voltage, devoid of the direct component originally associated therewith. This alternating voltage if used in its original form would certainly produce oscillation for hunting action of the circuit. However, it is rectified by the diode D5, and filtered through the associated notch filter, with the result that there appears across the output terminals 32 and 37 only a direct voltage. Thus it will be seen that in accordance with the present invention the alternating or ripple voltage appearing across storage capacitor C1 is fed back in a regenerative relationship, when is at the same time converted to a D.C. voltage so as to preclude the problem of oscillation or hunting action of the circuit.

The circuit as illustrated in the drawing has been found to provide very satisfactory results when utilized with the following parameter values:

| | |
|---|---|
| Line voltage | 115 volts A.C. |
| Load | ¾ horsepower D.C. shunt motor. |
| Lf | Two coils in parallel, each 75 turns approx. 1¼″ diam. on iron core. |
| D1, D2 | 1N3495 (10 amps., 400 v.). |
| D3, D4, D5 | 1N2070. |
| D6 | 1N91. |
| SCR1, SCR2 | C32B. |
| Zener | 20 volts, 1 watt. |
| Q1 | 2N2646. |
| Q2 | 2N398A. |
| R1, R4 | 100 ohms. |
| R2 | 5000 ohms. |
| R3, R6 | 1200 ohms. |
| R5, R8, R11 | 1000 ohms. |
| R7 | 300 ohms. |
| P1 | 1500 ohms. |
| R9 | 6800 ohms. |
| R10 | 35,000 ohms. |
| R12 | 470 ohms. |
| R13 | 3300 ohms. |
| R14 | Thermistor, 750 ohms. |
| Rb | 10 ohms, 25 watt. |
| T | Pulse transformer, 1:1:1, 500 ohms impedance, each winding. |
| C1 | 1000 microfarads, 200 volts. |
| C2, C3 | 50 µf., 10 v. |
| C4 | 125 µf., 10 v. |
| C5 | 0.15 µf., 200 v. (non-polarized). |
| C6 | 2 µf., 200 v. (non-polarized). |
| C7 | 250 µf., 50 v. |

While the illustrated circuit utilizes two controlled rectifiers it will nonetheless be understood that the present invention may be carried out with only a single controlled rectifier. Furthermore, the present drawing illustrates the use of a diode bridge rectifier in addition to the controlled rectifiers, but such is not essential to the present invention.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

I claim:

1. A regulated power supply circuit comprising, in combination:
   a controlled rectifier coupled to a source of alternating current and adapted to supply intermittently flowing, unidirectional current to a load;
   a storage capacitor connected in a series loop circuit with said controlled rectifier and the source of alternating current;
   means for coupling a load in parallel with said storage capacitor, whereby in its steady-state operation said storage capacitor receives discrete pulses of charging current from said controlled rectifier and alternately supplies pulses of current to the load;
   control means for periodically initiating conduction of said controlled rectifier;
   and a feedback circuit coupled across said storage capacitor, and intercoupled with said control means;
   said feedback circuit including means for producing a direct control voltage whose amplitude is substantially proportional to the amplitude of the ripple voltage occurring across said storage capacitor at the frequency of said pulses received from said controlled rectifier;
   said feedback circuit also including means for applying said direct control voltage to said control means 2. A regulated power supply circuit as claimed in claim 1 wherein said feedback circuit includes the series combination of a blocking capacitor and a load resistor coupled across said storage capacitor, and a rectifier and filter circuit coupled across said load resistor, for producing said direct control voltage.

3. A regulated power supply circuit as claimed in claim 1 which comprises an additional feedback circuit including first and second feedback resistors coupled in series across said storage capacitor, and circuit means for applying the voltage signal developed across said first feedback resistor to said control means.

4. A regulated power supply circuit as claimed in claim 2 which comprises an additional feedback circuit including first and second feedback resistors coupled in series across said storage capacitor, and circuit means for applying the voltage signal developed across said first feedback resistor to said control means.

5. A regulated power supply circuit as claimed in claim 4 wherein said control means includes a transistor having base, emitter, and collector electrodes, the output of said filter circuit being coupled to said base, said circuit means of said additional feedback circuit being coupled to said emitter.

6. A regulated power supply circuit as claimed in claim 5 wherein said control means further includes a unijunction transistor coupled between said first-named transistor and said controlled rectifier.

7. A regulated power supply circuit as claimed in claim 4 which further includes a potentiometer for controlling the action of said control means, said potentiometer being manually settable to provide a selected value of direct current output voltage across said storage capacitor.

8. A regulated power supply circuit as claimed in claim 5 which further includes a potentiometer for controlling the bias voltage on said transistor base, said potentiometer being manually settable to provide a selected value of direct current output voltage across said storage capacitor; said direct control voltage supplied by said filter circuit being operable to vary the energizing voltage across said potentiometer.

9. A motor speed control circuit for a shunt motor comprising, in combination:
   a D.C. motor having an armature;
   a controlled rectifier coupled to a source of alternating current and adapted to supply intermittently flowing, unidirectional current to said armature;
   a storage capacitor connected in a series loop circuit with said controlled rectifier and the source of alternating current;
   means for coupling said armature in parallel with said storage capacitor, whereby in its steady-state operation said storage capacitor receives discrete pulses of charging current from said controlled rectifier and alternately supplies pulses of current to the motor armature;
   control means including a potentiometer having a movable tap, transistor having base, emitter, and collector electrodes, said movable tap being connected to said base, and further including separate means controlled by said transistor for periodically initiating conduction of said controlled rectifier;
   a feedback circuit including the series combination of a blocking capacitor and a load resistor coupled across said storage capacitor, and a rectifier and filter circuit coupled across said load resistor for producing a direct control voltage whose amplitude is substantially proportional to the amplitude of the ripple voltage occurring across said storage capacitor at the frequency of said pulses received from said controlled rectifier, the output of said filter circuit being coupled to said potentiometer for varying the energizing voltage thereof;
   and an additional feedback circuit including first and second feedback resistors coupled in series across said storage capacitor, and a diode coupled between said first feedback resistor and said emitter for supplying to said emitter the voltage signal developed across said first feedback resistor.

10. A motor speed control circuit as claimed in claim 9 wherein said second feedback resistor has a resistance value of the order of fifty times that of said first feedback resistor.

11. A motor speed control circuit as claimed in claim 9 which further includes an accelerating capacitor connected between said movable tap and one end of said potentiometer.

12. A motor speed control circuit for a shunt motor comprising, in combination:
   a D.C. motor having an armature;
   a controlled rectifier coupled to a source of alternating current and adapted to supply intermittently-flowing, unidirectional current to said armature;
   a storage capacitor connected in a series loop circuit with said controlled rectifier and the source of alternating current;
   means for coupling said armature in parallel with said storage capacitor, whereby in its steady-state operation said storage capacitor receives discrete pulses of charging current from said controlled rectifier and alternately supplies pulses of current to said armature;
   control means including a potentiometer having a movable tap, a transistor having base, emitter, and collector electrodes, said movable tap being connected to said base, and further including separate means controlled by said transistor for periodically initiating conduction of said controlled rectifier;
   and a feedback circuit including the series combination of a blocking capacitor and a load resistor coupled across said storage capacitor, and a rectifier and filter circuit coupled across said load resistor for producing a direct control voltage whose amplitude is substantially proportional to the amplitude of the ripple voltage occurring across said storage capacitor at the frequency of said pulses received from said controlled rectifier, the output of said filter circuit being coupled to said potentiometer for varying the energizing voltage thereof.

13. A motor speed control circuit as claimed in claim 12 which further includes an accelerating capacitor connected between said movable tap and the low-speed end of said potentiometer.

14. A motor speed control circuit as claimed in claim 12 which includes a normally energized Zener diode, and a plurality of resistors coupled in a series loop circuit therewith, one of said resistors being said potentiometer, and the output of said filter circuit being coupled across another of said resistors.

15. A regulated power supply circuit comprising, in combination:
  rectifier means coupled to a source of alternating current and adapted to supply pulsating direct current to a load;
  a storage capacitor connected in circuit with said rectifier means and adapted to receive said pulsating direct current therefrom;
  means for coupling a load in parallel with said storage capacitor, whereby in its steady-state operation said storage capacitor receives discrete pulses of charging current from said rectifier means and alternately supplies pulses of current to the load;
  control means for controlling the action of said rectifier means;
  and a feedback circuit coupled across said storage capacitor, and intercoupled with said control means;
  said feedback circuit including means responsive to the ripple voltage occurring across said storage capacitor at the pulsation frequency of said pulsating direct current for producing a direct control voltage whose amplitude is proportional to the amplitude of said ripple voltage;
  said feedback circuit also including means for applying said direct control voltage to said control means.

References Cited

UNITED STATES PATENTS

| | | | |
|---|---|---|---|
| 3,095,534 | 6/1963 | Cockrell | 318—345 X |
| 3,177,417 | 4/1965 | Wright | 318—345 X |
| 3,184,672 | 5/1965 | Mason et al. | 318—345 |

ORIS L. RADER, *Primary Examiner.*

J. J. BAKER, *Assistant Examiner.*